3,165,421
SUBSTRATE COATED WITH AN ADHESIVE LAYER AND METHOD OF MAKING THE COATED SUBSTRATE
Robert E. Politi, Winchester, and James R. Aronson, Cambridge, Mass., assignors to Arthur D. Little, Inc., Cambridge, Mass., a corporation of Massachusetts
No Drawing. Filed Nov. 10, 1961, Ser. No. 151,456
6 Claims. (Cl. 117—33)

This invention relates to adhesives and more particularly to adhesives which are activated by heat and applied by means of heat and pressure or by pressure alone, and to supporting stock coated with such an adhesive.

There exists a great demand for labels, tags, tape, etc., having an adhesive backing which permits their attachment by pressure to a wide variety of surfaces. A few examples would include labels to mark and seal foodstuff packages, small labels or tags for indicating the price of an item, and tapes for sealing cartons.

The usual pressure-sensitive adhesive coated substrates and particularly those used in large quantities for industrial purposes, must be protected by suitable interleaving sheets such as silicone-treated release paper. Such interleaving or protective sheets used to prevent the adhesion of one layer to another when layers are stacked or rolled, must be removed and disposed of. This means that provision must be made to remove the interleaf material from its normal position over the pressure-sensitive adhesive surface before the pressure-sensitive treated surface can be applied to the article for which it is intended. The interleaving sheets add weight and volume to the tape, labels, etc., coated with pressure-sensitive adhesive. Moreover, the interleaf material is initially expensive, a fact which adds materially to the cost of the labels, tapes, etc., since the interleaf material is usually not recoverable.

Alternatively, if a protective interleaving material is not used, it is necessary to coat the obverse side of the stock with a so-called release coating (see, for example, U.S. Patent 2,648,614). This means an additional step in the manufacture of the final product having the adhesive coating. Moreover, it is not feasible to try to print or write on a release coating.

A truly pressure-sensitive adhesive coated sheet or stock cannot easily be processed (for example, die cut, printed or perforated) unless the pressure-sensitive surface is covered with the interleaf material. These processing difficulties arise because the pressures involved in these operations normally cause the pressure-sensitive adhesive surface to stick to the conventional supporting surface of the printing press, the cutting dies, etc. However, even when interleaf material is used in die cutting, printing, perforating, etc., difficulty is still encountered in removing the interleaving material from the cut, printed or perforated items, particularly if the items are intricate in shape. This is caused when the bond between the pressure-sensitive adhesive and the interleaf sheet is greater than the tear resistance of the stock or backing to which the pressure-sensitive adhesive has been applied. For example, labels having an intricate shape or having a large number of indexing notches may be easily torn in removing the interleaf material before application, particularly if automatic removal of the interleaf is attempted. Thus added to the extra expense, weight and volume of the interleaf material is the possibility of wasting the pressure-sensitive adhesive coated stock itself. Coating the obverse side with a release coating does not eliminate the use of an interleaf material if stock coated with a pressure-sensitive material is to be die cut, printed or perforated.

There are, in addition to pressure-sensitive adhesives, so-called instantaneous heat-activatable adhesives. These are thermoplastic compositions which are nontacky under normal temperature conditions, but which become tacky when heated. In using substrate coated with these adhesives, it is necessary to apply heat and pressure simultaneously, since the adhesive reverts to a nontacky condition instantly upon being reduced to a normal room temperature. Thus final application of such items as tape, labels, etc., having an instantaneous heat-activatable adhesive must be accomplished at the time heat is applied. A recent variant of the heat-activatable adhesive is the so-called "delayed tack" adhesive (see, for example, U.S. Patent 2,678,284). These delayed tack adhesives contain a substantial amount of crystalline solid plasticizer along with resinous materials. When they are subjected to heat, the plasticizer and resin phases are blended to form an amorphous, tacky mass which will remain tacky, when cooled to room temperature, for a finite period of time which is determined by the adhesive composition. Delayed-tack adhesive coated on sheets or substrates may be activated by heat, and during the finite period in which they remain tacky, the substrates may be adhered to the desired surface by pressure alone. These adhesives are particularly used on labels to be applied to plastic films having low heat distortion points such as polyethylene and Saran (a polyvinylidene chloride). In contrast, when the substrates are coated with conventional instantaneous heat-activatable adhesives, difficulties are encountered in adhering them to such films for the heat required in activation distorts the film.

It is, therefore, apparent that the delayed-tack adhesives possess inherent advantages over both pressure-sensitive and the instantaneous heat-activatable adhesives. The adhesive of this invention is an improved delayed-tack adhesive.

It is, therefore, an object of this invention to furnish an adhesive which becomes and remains pressure-sensitive in character for a finite period of time after having been raised to an activating temperature, the adhesive before activation being nonpressure-sensitive and requiring no interleaf material. Another object is to provide an adhesive which permits printing or stamping on the obverse side of the stock or backing after the adhesive has been applied without the use of any interleaf material. It is a further object to furnish an adhesive which permits simultaneously die cutting or perforating a number of layers of stock coated with adhesive without using interleaving sheets and without causing the layers to stick together.

It is still a further object to furnish a delayed-tack adhesive which does not require a removable protective interleaving sheet and which therefore eliminates the added weight, volume and cost of the protective sheet. It is still another object of this invention to furnish an adhesive which may be activated by heat and subsequently applied by pressure alone. These and other objects will become apparent in the following discussion.

The improved delayed-tack adhesive of this invention comprises an adhesive layer and on it a layer of a plasticizer which is distinct from the plasticizer used in the adhesive layer itself. The adhesive layer comprises a combination of one or more elastomers and diphenyl phthalate as a plasticizer, with or without resins, the ratios being adjusted so that the final adhesive layer possesses the proper degree of tackiness when activated by heat. When a substrate of stock or backing is surface coated with the adhesive of this invention, it may be rolled up on itself, stacked or otherwise handled without adhering to contiguous layers or to any other surface until the adhesive is activated by heat. With heat activation, the powdered plasticizer layer blends with the adhesive and serves as a second plasticizer in addition to the diphenyl phthalate already present in the pressure-sensitive adhesive layer.

The powdered plasticizer makes up only a minor portion of the adhesive on the substrate and does not materially affect the overall performance of the adhesive. It will be appreciated that in blending with the adhesive layer, the dusting plasticizer of this invention does not detract from the characteristics of the adhesive, such as a typical dusting powder (e.g., talc) might do.

The adhesive layer is a thermoplastic adhesive preferably containing a vinyl polymer or copolymer (having, if required, some additional resinous material as a tackifier), and diphenyl phthalate as a plasticizer. The additional surface plasticizer which is the dusting layer serving to induce recrystallization of the tacky adhesive layer is a substituted diphenyl phthalate and more particularly may be either di-(m-cresyl) phthalate or di-(o-cresyl) phthalate. It should be noted that the commercially available mixed cresyl phthalates which contain appreciable amounts of di-(p-cresyl) phthalate are not suitable as the dusting layer because they will not induce the required recrystallization of the adhesive layer and convert it to the nontacky condition.

The adhesive of this invention may be further described with reference to the following examples which are meant to be illustrative and not limiting.

Example I

A suitable dusting powder in the form of di-(m-cresyl) phthalate was prepared in the following manner. Sixty-two grams (0.5 mol) of phthalyl chloride was heated to 40° C. and then 108 grams (one mol) of metacresol was added slowly to the phthalyl chloride. The mixture was stirred and maintained at about 40° C. The temperature was controlled and maintained at approximately 40° C. during the entire addition period of the metacresol and until the reaction was complete as evidenced by a cessation in the evolution of HCl. The product was washed with boiling water, dried in an oven at 104° C. and allowed to recrystallize. This material when cooled at room temperature was hammer-milled to the extent that it was pass a 200-mesh seive. The resulting finely divided di-(m-cresyl) phthalate was then used as the dusting powder.

A delayed-tack, heat-activatable adhesive was prepared by blending 61 parts by weight of diphenyl phthalate as a plasticizer with 17 parts by weight of a coumarone-indene modified phenolic resin and 22 parts by weight of polyvinyl acetate. This adhesive was applied as a hot melt to a paper suitable for label stock and allowed to cool to room temperature to form a tacky adhesive surface on the label stock. Any suitable technique for applying adhesives of the type used may, of course, be used in depositing the adhesive on the substrate. In addition to applying as a hot melt, it may be put on in a solution or dispersion by any of a number of methods including spraying, roll coating, and the like.

The di-(m-cresyl) phthalate which had been prepared was then employed as the dusting powder on this adhesive surface. The finely divided di-(m-cresyl) phthalate was brushed on the surface and any excess which did not adhere to the adhesive surface was removed. This coating of plasticizer induced recrystallization of the adhesive, causing it to set instantaneously to a nontacky state.

The dusting powder was a free-flowing material which was easy to handle during the dusting process. There was no tendency to cake or agglomerate and it formed a smooth, evenly distributed surface over the adhesive.

The adhesive-coated stock could be rolled upon itself and it could be printed on the reverse or uncoated side. Moreover, a number of adhesive coated sheets of the stock were stacked on each other and successfully die cut and perforated without any adherence of one sheet to the other.

When the adhesive was activated by heat (about 100° C. or higher), it became tacky and remained tacky for a period of at least 48 hours. In the heat activation the di-(m-cresyl) phthalate became an integral part of the adhesive, serving as an additional plasticizer for it.

Example II

Di-(o-cresyl) phthalate was prepared in the same manner as the di-(m-cresyl) phthalate in Example I above, except that orthocresol was substituted for the metacresol of that example. In like manner, label stock was coated with the adhesive of Example I and dusted with the di-(o-cresyl) phthalate. The adhesive thus made possessed essentially the same characteristics as that of Example I.

Example III

A quantity of di-(p-cresyl) phthalate was made by substituting the metacresol in Eample I with paracresol. The resulting di-(p-cresyl) phthalate was dusted on the adhesive layer as in Example I. However, in this case the adhesive layer did not recrystallize to the non-tacky state and when the stock was wound upon itself, there was a marked degree of self-adherence and blocking experienced.

Other delayed-track adhesives were made up and dusted with di-(m-cresyl) phthalate, di-(o-cresyl) phthalate and di-(p-cresyl) phthalate as in Examples I, II, and III above. The results were substantially identical to those described, the di-(m-cresyl) and di-(o-cresyl) phthalates serving as good recrystallizers while the di-(p-cresyl) phthalate failed to induce the required recrystallization of the adhesive to the nontacky state. The compositions of three such adhesives are tabulated below.

[Composition, Percent by Weight]

| Adhesive Component | Example IV | Example V | Example VI |
|---|---|---|---|
| Polyvinyl butyral | 20 | | 18 |
| Terpene resin | 20 | | |
| Vinyl acetate-vinyl stearate copolymer | | 23 | |
| Coumarone-indene modified phenolic resin | | 20 | |
| Ester gum | | | 17 |
| Diphenyl phthalate | 60 | 57 | 65 |

The diphenyl phthalate which is the plasticizer used in the adhesive composition may be used as the dusting layer, but it has a tendency to cake and agglomerate and requires fairly rigid control over the temperature of the adhesive layer during its application. In contrast to this, the dusting layers of this invention do not require as rigid a control of temperature, being applicable to adhesives at a temperature up to about 70° C. Moreover, the di-(m-cresyl) and di-(o-cresyl) phthalates are free-flowing materials which can be handled in standard equipment due to the fact that they do not cake or agglomerate readily. The ease with which the two phthalates of this invention may be handled is apparently due at least in part to their comparatively high melting points, being 98° and 99° C. for the di-(m-cresyl) and di-(o-cresyl), respectively.

In the use of these materials as dusting powders, the high melting point material achieves unexpected advantages over the lower melting point materials, making the process of depositing a dusting layer on a pressure-sensitive adhesive attractive for many uses.

It is, of course, within the scope of this invention to use any suitable material for the substrate on which the adhesive is deposited. Thus paper, cellophane, fabrics, nonwovens, and rigid materials such as metal foils and the like may be used.

The composition of the basic adhesive formulation may also be varied as indicated in Examples IV—VI. Vinyl copolymers such as a copolymer of vinyl chloride-vinyl acetate or vinyl acetate-vinyl stearate may be used as the elastomer. Likewise, resins other than the coumarone-indene modified phenolics may be added if desired. The degree of tackiness may be further controlled by the use of other tackifiers, waxes, gums and fillers in addition to the diphenyl phthalate. The weight ratios of the components of the adhesive layer (i.e., elastomer, diphenyl phthalate and resin, if the latter is used) will vary widely. The adhesive layer composition must, however, be such that it can be made to revert substantially instantaneously to the nontacky state when the dusting layer is applied. In general, the amount of diphenyl phthalate incorporated in the adhesive layer as a plasticizer will amount to at least 40% by weight of the adhesive composition. The choice of elastomer will, of course, dictate which and how much tackifier, if any, is to be used.

From the above description and examples of this invention, it will be seen that there is provided an improved delayed-tack adhesive comprising an elastomer, a plasticizer, along with a tackifier or any other desired modifiers. When such an adhesive is dusted with a layer of a dry powder selected from the group consisting of di-(m-cresyl) phthalate and di-(o-cresyl) phthalate, it is possible to substantially instantaneously convert the adhesive to a nontacky state. Moreover, the dusting layer, when the adhesive is activated by heat, becomes an integral part of the adhesive. This in turn means that none of the adhesive properties are diminished as may be the case in the use of inert materials serving as a protective coating, and that the protective coating need not be physically removed.

It will be appreciated that modifications in adhesive compositions and in the manner in which they are applied and handled are possible and they are within the scope of this invention.

We claim:
1. As a new article of manufacture, a substrate coated on at least one side with an adhesive layer comprising an elastomer, and diphenyl phthalate as a plasticizer, said adhesive layer being substantially uniformly and completely covered with a finely divided dusting layer of a plasticizer selected from the group consisting of di-(m-cresyl) phthalate and di-(o-cresyl) phthalate.

2. New article in accordance with claim 1 wherein said elastomer is a vinyl polymer.

3. New article in accordance with claim 1 wherein said elastomer is a vinyl copolymer.

4. As a new article of manufacture, a substrate coated on at least one side with an adhesive layer comprising an elastomer, diphenyl phthalate and a tackifier, said adhesive layer being substantially uniformly and completely covered with a finely divided dusting layer of a plasticizer selected from the group consisting of di-(m-cresyl) phthalate and di-(o-cresyl) phthalate.

5. New article in accordance with claim 4 wherein said tackifier is a coumarone-indene modified phenolic resin.

6. Method of coating a substrate with a delayed-tack, heat-activatable adhesive, comprising the steps of applying to at least one surface of said substrate a thermoplastic adhesive in a fluid state, said adhesive comprising an elastomer and diphenyl phthalate as a plasticizer, and subsequently substantially completely and uniformly covering the tacky surface of said adhesive with a finely divided dusting powder selected from the group consisting of di-(m-cresyl) phthalate and di-(o-cresyl) phthalate thereby to recrystallize said adhesive and to render it free from tackiness until heat is applied to activate said adhesive.

References Cited in the file of this patent
UNITED STATES PATENTS

| | | |
|---|---|---|
| 2,605,328 | Pintell | July 29, 1952 |
| 2,613,156 | McGaffin et al. | Oct. 7, 1952 |
| 2,643,238 | Crozier et al. | June 23, 1953 |
| 2,678,284 | Holt | May 11, 1954 |